United States Patent
Seo et al.

(10) Patent No.: US 10,397,909 B2
(45) Date of Patent: Aug. 27, 2019

(54) METHOD AND DEVICE FOR RECEIVING DOWNLINK SIGNAL IN WIRELESS COMMUNICATION SYSTEM

(71) Applicant: LG ELECTRONICS INC., Seoul (KR)

(72) Inventors: Inkwon Seo, Anyang-si (KR); Jonghyun Park, Anyang-si (KR); Hanbyul Seo, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/386,445

(22) Filed: Dec. 21, 2016

(65) Prior Publication Data
US 2017/0099656 A1 Apr. 6, 2017

Related U.S. Application Data

(63) Continuation of application No. 14/422,315, filed as application No. PCT/KR2013/007896 on Sep. 2, 2013, now Pat. No. 9,565,667.
(Continued)

(30) Foreign Application Priority Data

Aug. 30, 2013 (KR) ........................ 10-2013-0104278

(51) Int. Cl.
*H04W 72/04* (2009.01)
*H04W 76/27* (2018.01)
(Continued)

(52) U.S. Cl.
CPC ......... *H04W 72/042* (2013.01); *H04L 5/0048* (2013.01); *H04L 5/0051* (2013.01);
(Continued)

(58) Field of Classification Search
CPC . H04W 72/042; H04W 76/046; H04W 76/27; H04L 5/0048; H04L 5/0051; H04L 5/0053; H04L 27/2613; H04L 25/03
See application file for complete search history.

(56) References Cited

U.S. PATENT DOCUMENTS

2013/0279437 A1* 10/2013 Ng ........................ H04W 48/16
370/329
2013/0294368 A1* 11/2013 Bendlin .............. H04W 72/042
370/329
(Continued)

FOREIGN PATENT DOCUMENTS

CN 102573094 A 7/2012
RU 2 384 983 C2 3/2010
WO WO 2012/109542 A1 8/2012

OTHER PUBLICATIONS

Ericsson et al., "Discussion Paper on Antenna Ports Quasi Co-location", 3GPP TSG RAN WG1 Meeting #70, R1-123746, Qingdao, China, Aug. 13-17, 2012, 9 pages.
(Continued)

*Primary Examiner* — Habte Mered
(74) *Attorney, Agent, or Firm* — Fish & Richardson P.C.

(57) ABSTRACT

A method is provided for receiving a downlink signal through an Enhanced Physical Downlink Control Channel (EPDCCH) in a wireless communication system by a user equipment (UE). The UE receives a parameter indicating a quasi co-location behavior type is. The UE further receives a demodulation reference signal (DMRS) associated with the EPDCCH. The UE attempts to decode the EPDCCH based on the DMRS. If a transmission mode configured in the UE is a transmission mode 10, the UE assumes that antenna ports of the DMRS are quasi co-located with antenna ports of a reference signal determined by the parameter.

13 Claims, 10 Drawing Sheets

Related U.S. Application Data

(60) Provisional application No. 61/718,166, filed on Oct. 24, 2012, provisional application No. 61/715,264, filed on Oct. 17, 2012, provisional application No. 61/709,943, filed on Oct. 4, 2012, provisional application No. 61/695,305, filed on Aug. 31, 2012.

(51) Int. Cl.
  *H04L 5/00* (2006.01)
  *H04L 25/03* (2006.01)
  *H04L 27/26* (2006.01)

(52) U.S. Cl.
  CPC ............ *H04L 5/0053* (2013.01); *H04L 25/03* (2013.01); *H04L 27/2613* (2013.01); *H04W 76/27* (2018.02)

(56) References Cited

U.S. PATENT DOCUMENTS

| | | | |
|---|---|---|---|
| 2013/0301434 A1 | 11/2013 | Krishnamurthy et al. | |
| 2013/0301542 A1 | 11/2013 | Krishnamurthy et al. | |
| 2014/0036800 A1* | 2/2014 | Frenne ................. | H04L 5/0035 370/329 |
| 2014/0092827 A1* | 4/2014 | Jongren ................ | H04L 5/0053 370/329 |
| 2014/0092829 A1* | 4/2014 | Han ...................... | H04L 5/0035 370/329 |
| 2015/0334736 A1 | 11/2015 | Chandra et al. | |

OTHER PUBLICATIONS

Ericsson, "Summary of Quasi co-located Antenna Ports Session", 3GPP TSG RAN WG1 #70, R1-123968, Qingdao, China, Aug. 13-17, 2012, 7 pages.

Huawei et al., "Discussion on antenna ports collocation", 3GPP TSG RAN WG1 Meeting #70, R1-123124, Qingdao, China, Aug. 13-17, 2012, 11 pages.

LG Electronics, "Discussion on quasi-co-located antenna ports", 3GPP TSG RAN WG1 Meeting #70, R1-123538, Qingdao, China, Aug. 13-17, 2012, pp. 1-5.

Nokia et al., "On Quasi-co-located Antenna Ports", 3GPP TSG RAN WG1 Meeting #70, R1-123658, Qingdao, China, Aug. 13-17, 2012, 7 pages.

Ericsson, "LS response on antenna ports co-location," 3GPP TSG-RAN1 Meeting #70, R1-124020, Qingdao, China, Aug. 13-17, 2012, 3 pages.

Huawei et al., "DMRS sequences for ePDCCH," 3GPP TSG RAN WG1 meeting #68, R1-120870, Dresden, Germany, Feb. 6-10, 2012, 8 pages.

Intel Corporation, "Remaining issues of antenna ports quasi co-location definition," 3GPP TSG-RAN WG1 #70, R1-123425, Qingdao, China, Aug. 13-17, 2012, 8 pgs.

MCC Support, "Draft Report of 3GPP TSG RAN WG1 #69 v0.2.0," 3GPP TSG RAN WG1 Meeting #70, R1-128016, XP050601335, Qingdao, People's Republic of China, Aug. 13-17, 2012, pp. 1-121.

New Postcom, "Discussions on quasi-co-located antenna ports," 3GPP TSG RAN WG1 Meeting #70, R1-123440, Qingdao, China Aug. 13-17, 2012, pp. 1-3.

\* cited by examiner

FIG. 6
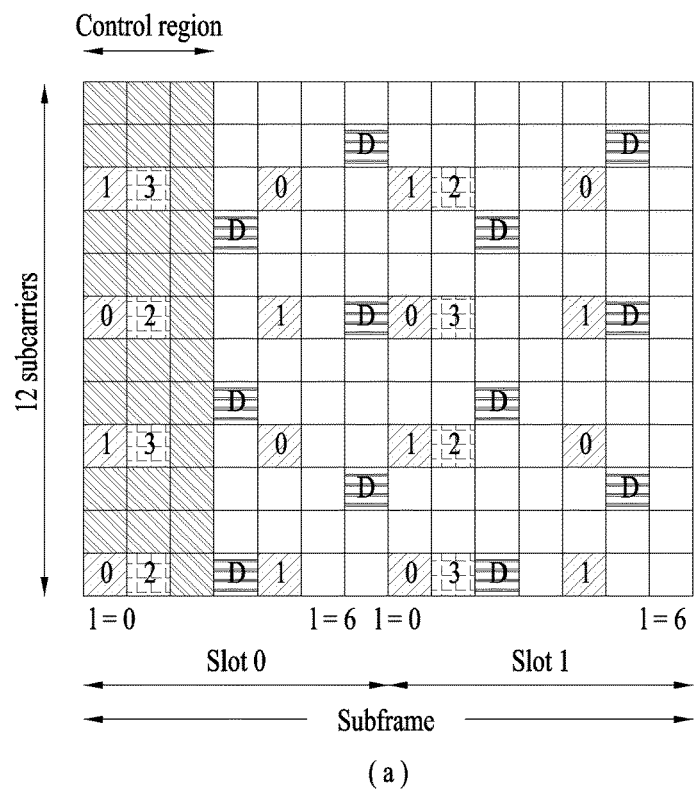
(a)
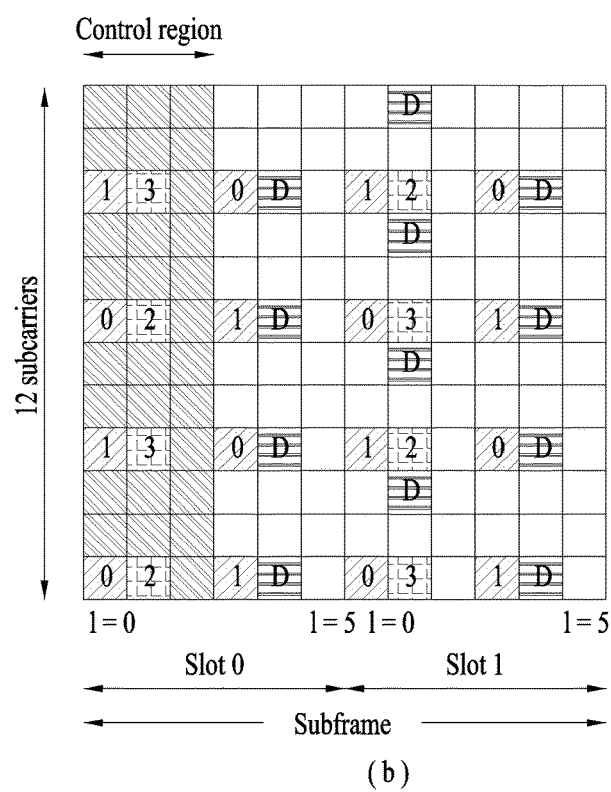
(b)

FIG. 7
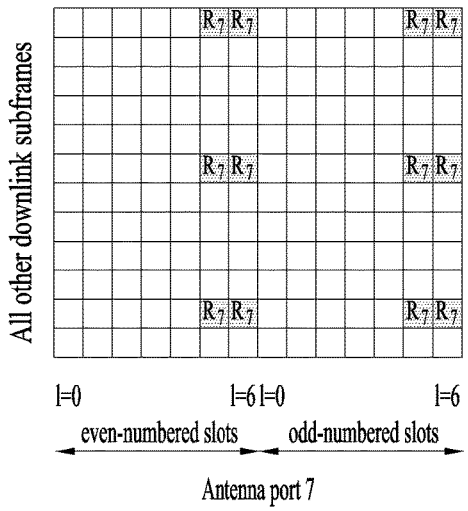
Antenna port 7
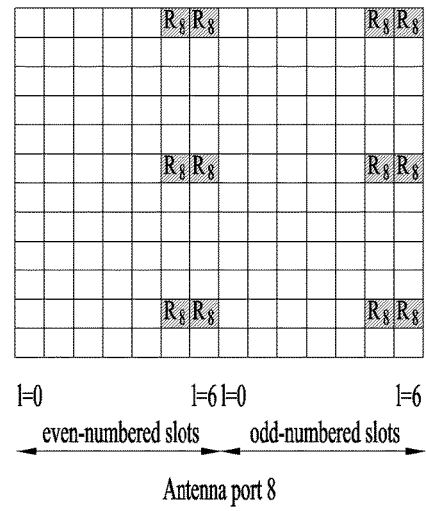
Antenna port 8
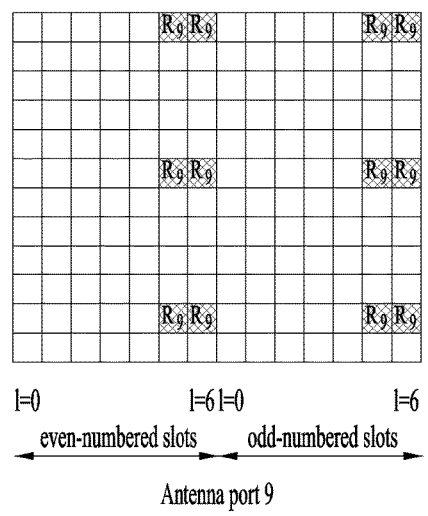
Antenna port 9
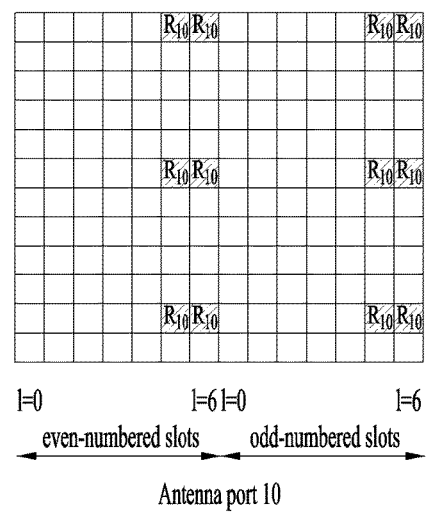
Antenna port 10

METHOD AND DEVICE FOR RECEIVING DOWNLINK SIGNAL IN WIRELESS COMMUNICATION SYSTEM

CROSS-REFERENCE TO RELATED APPLICATIONS

This Application is a Continuation of U.S. patent application Ser. No. 14/422,315 filed on Feb. 18, 2015 (now U.S. Pat. No. 9,565,667 which issued on Feb. 7, 2017), which is filed as the National Phase of PCT/KR2013/007896 filed on Sep. 2, 2013, which claims the benefit under 35 U.S.C. § 119(e) to U.S. Provisional Application Nos. 61/718,166 filed on Oct. 24, 2012, 61/715,264 filed on Oct. 17, 2012, 61/709,943 filed on Oct. 4, 2012, and 61/695,305 filed on Aug. 31, 2012, and under 35 U.S.C. § 119(a) to Korean Patent Application No. 10-2013-0104278 filed on Aug. 30, 2013, all of which are hereby expressly incorporated by reference into the present application.

BACKGROUND OF THE INVENTION

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

SUMMARY OF THE INVENTION

The present invention relates to a wireless communication system, and more particularly to a method and apparatus for receiving control information through an enhanced physical downlink channel (EPDCCH).

An object of the present invention is to provide a method for more correctly performing channel estimation using a demodulation reference signal (DMRS) associated with an EPDCCH so as to receive control information through the EPDCCH.

It is to be understood that technical objects to be achieved by the present invention are not limited to the aforementioned technical objects and other technical objects which are not mentioned herein will be apparent from the following description to one of ordinary skill in the art to which the present invention pertains.

The object of the present invention can be achieved by providing a method for receiving a downlink signal through an Enhanced Physical Downlink Control Channel (EPDCCH) in a wireless communication system by a user equipment (UE) including: receiving a demodulation reference signal (DMRS) in an EPDCCH physical resource block (PRB) set; and attempting to decode an EPDCCH in the EPDCCH PRB set by referring to the demodulation reference signal (DMRS), wherein, if a transmission mode configured to the user equipment (UE) is a predetermined transmission mode, the UE assumes that a cell-specific reference signal of a serving cell and the demodulation reference signal (DMRS) are quasi co-located (QCL).

In accordance with another aspect of the present invention, a user equipment (UE) device for receiving a downlink signal in a wireless communication system includes: a reception (Rx) module; and a processor, wherein the processor receives a demodulation reference signal (DMRS) in an EPDCCH physical resource block (PRB) set, and attempts to decode an EPDCCH in the EPDCCH PRB set by referring to the demodulation reference signal (DMRS). If a transmission mode configured to the user equipment (UE) is a predetermined transmission mode, the UE assumes that a cell-specific reference signal of a serving cell and the demodulation reference signal (DMRS) are quasi co-located (QCL)

The first and second technical aspects may include the following items.

The predetermined transmission mode may be set to any one of transmission modes 1~9.

If the transmission mode configured to the UE is set to a transmission mode 10, the UE may assume that previously-signaled non-zero power channel state information reference signal (CSI-RS) and the demodulation reference signal (DMRS) are quasi co-located.

The QCL assumption may be associated with Doppler spread, delay spread, and average delay.

The UE may derive a large scale property of a transmission channel through which the DMRS is transmitted, from the cell-specific reference signal.

The large scale property may include Doppler spread, delay spread, and average delay.

The UE may assume that the cell-specific reference signal and a demodulation reference signal (DMRS) associated with PDSCH are quasi co-located with under the predetermined transmission mode.

The QCL assumption may be associated with Doppler spread, delay spread, and average delay.

The UE may receive QCL information for each EPDCCH PRB set.

The QCL information is information of antenna ports which can be assumed that the antenna ports are quasi co-located with the demodulation reference signal (DMRS).

The QCL information may be received through Radio Resource Control (RRC) signaling.

The QCL information for each EPDCCH PRB set may be signaled through an independent information element (IE).

The UE may regard that legacy QCL information is maintained in the EPDCCH PRB set for which QCL information is not signaled.

The UE may apply QCL information of the EPDCCH PRB set for which QCL information is signaled, to the EPDCCH PRB set for which the QCL information is not signaled.

The received QCL information may be valid only in a specific transmission mode.

As is apparent from the above description, the embodiments of the present invention can more accurately recognize large scale properties of a channel when performing channel estimation using a demodulation reference signal (DMRS) associated with an EPDCCH.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIG. 6, including view (a) and view (b), is a conceptual diagram illustrating a reference signal (RS).

FIG. 7 is a conceptual diagram illustrating a demodulation reference signal (DMRS).

DETAILED DESCRIPTION OF THE EMBODIMENTS

Figure 1:
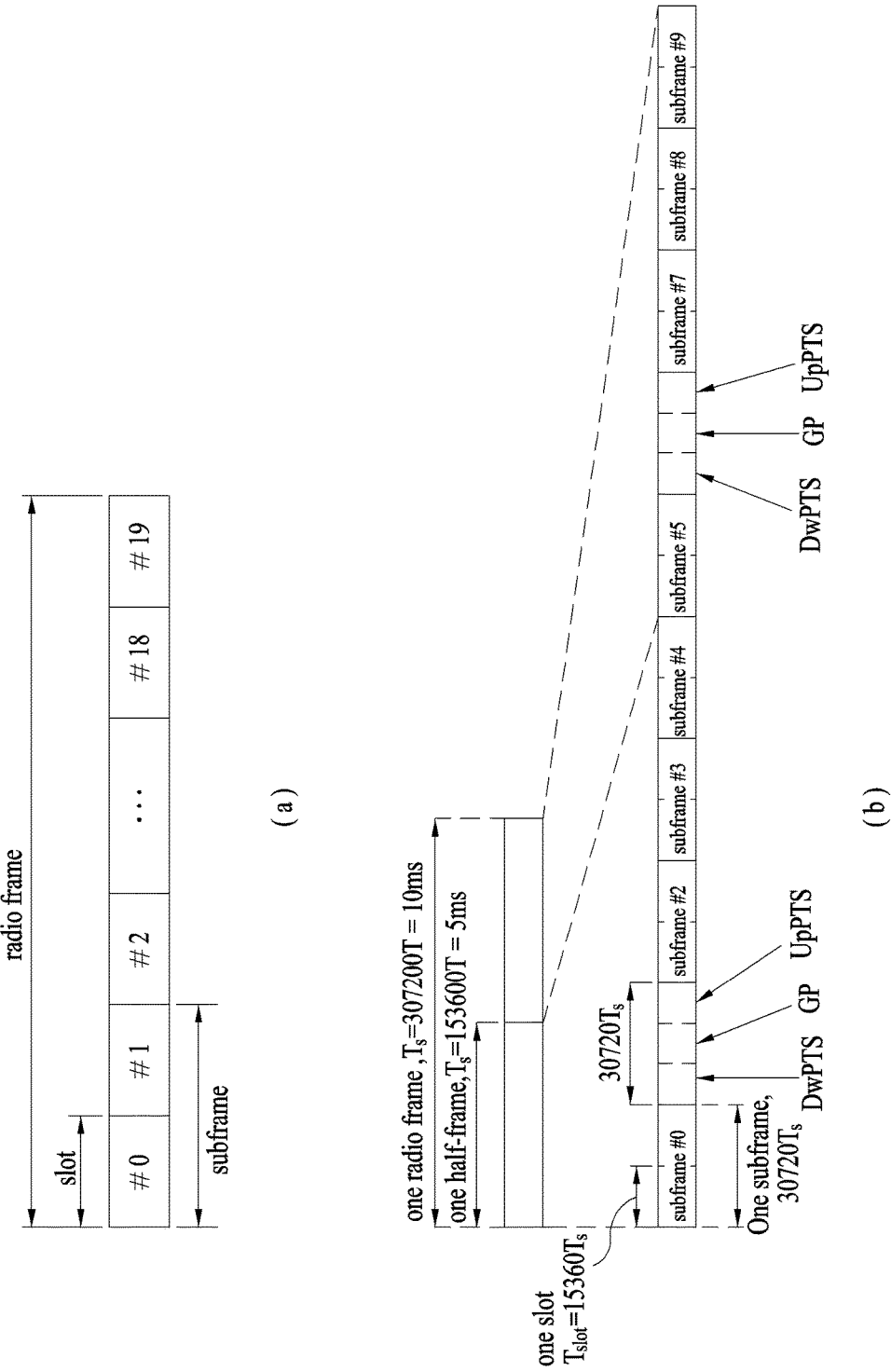
FIG. 1, including view (a) and view (b), exemplarily shows a radio frame structure.

The embodiments described below are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

That is, it is obvious that various operations performed to implement communication with the terminal over a network composed of multiple network nodes including a base station can be conducted by the base station or network nodes other than the base station. The term "base station (BS)" may be replaced with terms such as "fixed station," "Node-B," "eNode-B (eNB)," and "access point." The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms used in the description below are intended to provide better understanding of the present invention, and these specific terms may be changed to other forms within the technical spirit of the present invention.

In some cases, well-known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention can be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communication (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e standard (WirelessMAN-OFDMA reference system) and advanced IEEE 802.16m standard (WirelessMAN-OFDMA Advanced system). For clarity, the following description focuses on 3GPP LTE and 3GPP LTE-A systems. However, the spirit of the present invention is not limited thereto.

LTE/LTE-A Subframe Structure/Channel

Hereinafter, a radio frame structure will be described with reference to FIG. 1, including view (a) and view (b).

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports radio frame structure type 1 applicable to frequency division duplex (FDD) and radio frame structure type 2 applicable to time division duplex (TDD).

FIG. 1(a) illustrates radio frame structure type 1. A downlink radio frame is divided into 10 subframes. Each subframe includes two slots in the time domain. The duration of transmission of one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, each slot may include 7 OFDM symbols. For an extended CP configuring each OFDM symbol, the duration of each OFDM symbol is extended and thus the number of OFDM symbols included in a slot is smaller than in the case of the normal CP. For the extended CP, each slot may include, for example, 6 OFDM symbols. When a channel state is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other OFDM symbols may be allocated to a physical downlink shared channel (PDSCH).

FIG. 1(b) illustrates radio frame structure type 2. A type-2 radio frame includes two half frames, each of which has 5 subframes, downlink pilot time slots (DwPTSs), guard periods (GPs), and uplink pilot time slots (UpPTSs). Each subframe consists of two slots. The DwPTS is used for initial cell search, synchronization, or channel estimation in a UE, whereas the UpPTS is used for channel estimation in an eNB and UL transmission synchronization of a UE. The GP is provided to eliminate UL interference caused by multipath delay of a DL signal between DL and UL. Regardless of the types of radio frames, a subframe consists of two slots.

The illustrated radio frame structures are merely examples, and various modifications may be made to the number of subframes included in a radio frame, the number of slots included in a subframe, or the number of symbols included in a slot.

Figure 2:
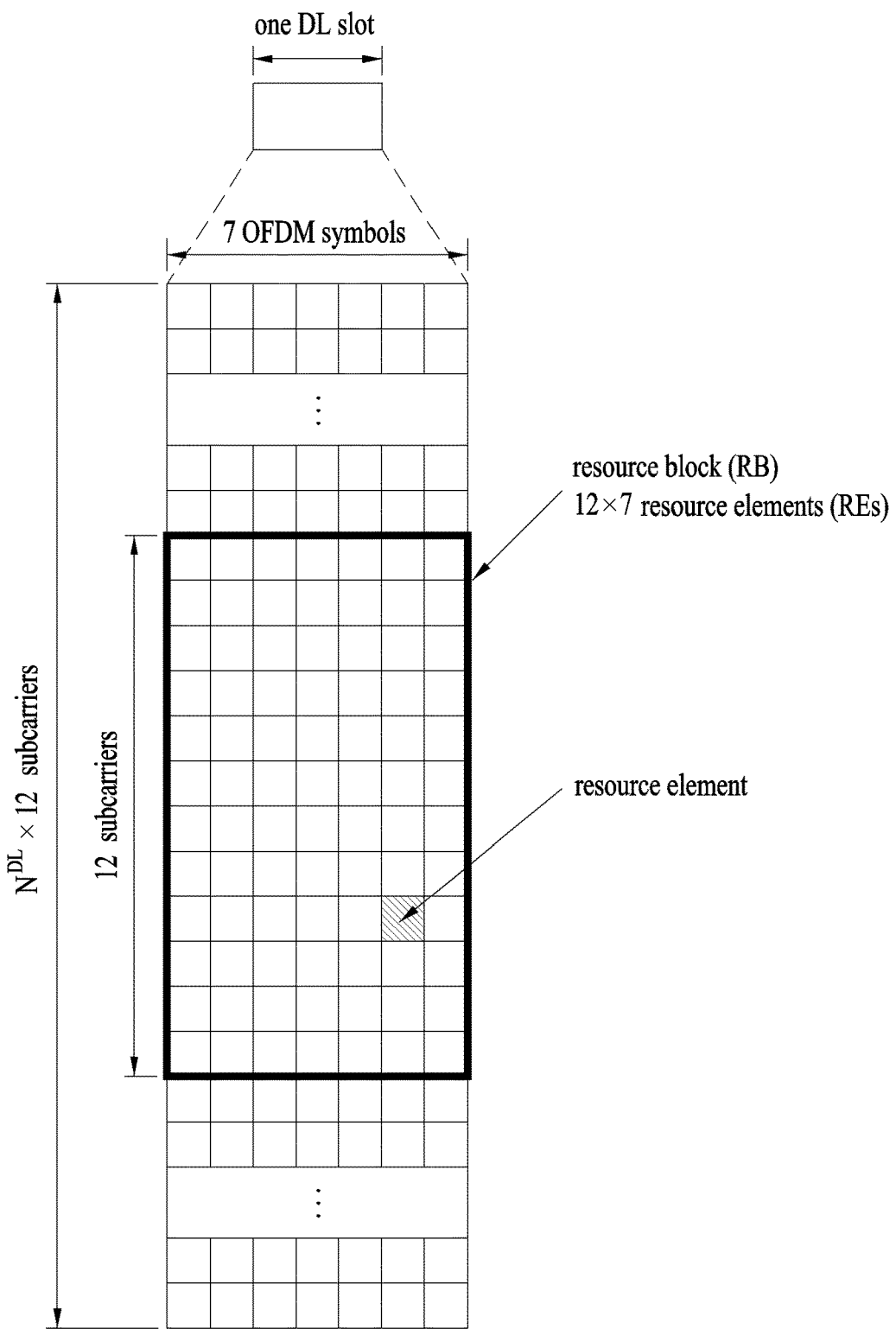
FIG. 2 exemplarily shows a resource grid of a downlink slot.

FIG. 2 is a diagram illustrating a resource grid of one DL slot. One DL slot includes 7 OFDM symbols in the time domain and an RB includes 12 subcarriers in the frequency domain. However, embodiments of the present invention are not limited thereto. For the normal CP, a slot may include 7 OFDM symbols. For the extended CP, a slot may include 6 OFDM symbols. Each element in the resource grid is referred to as a resource element (RE). An RB includes 12×7 REs. The number $N^{DL}$ of RBs included in a DL slot depends on a DL transmission bandwidth. A UL slot may have the same structure as the DL slot.

Figure 3:
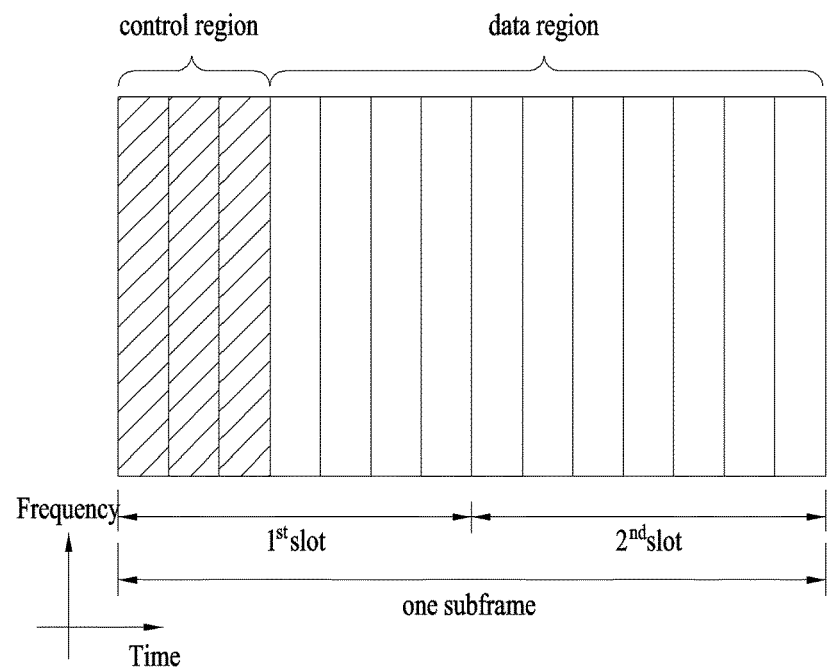
FIG. 3 exemplarily shows a downlink subframe structure.

FIG. 3 illustrates a DL subframe structure. Up to three OFDM symbols in the leading part of the first slot in a DL subframe corresponds to a control region to which a control channel is allocated. The other OFDM symbols of the DL subframe correspond to a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or a UL transmit power control command for a UE group. The PDCCH may deliver information about the resource allocation and transport format of a DL shared channel (DL-SCH), resource allocation information of a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs in a UE group, transmit power control information, and voice over internet protocol (VoIP) activation information. A plurality of PDCCHs may be transmitted in the control region. A UE may monitor a plurality of PDCCHs. A PDCCH is transmitted in an aggregation of one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and the coding rate provided by the CCEs. An eNB determines the PDCCH format according to DCI transmitted to a UE and adds a cyclic redundancy check (CRC) to the control information. The CRC is masked with an identifier (ID) known as a radio network temporary identifier (RNTI) according to the owner or usage of the PDCCH. If the PDCCH is directed to a specific UE, its CRC may be masked with a cell-RNTI (C-RNTI) of the UE. If the PDCCH is for a paging message, the CRC of the PDCCH may be masked with a paging radio network temporary identifier (P-RNTI). If the PDCCH delivers system information (more specifically, a system information block (SIB)), the CRC may be masked with a system information ID and a system information RNTI (SI-RNTI). To indicate a random access response which is a response to a random access preamble transmitted by a UE, the CRC may be masked with a random access-RNTI (RA-RNTI).

Figure 4:
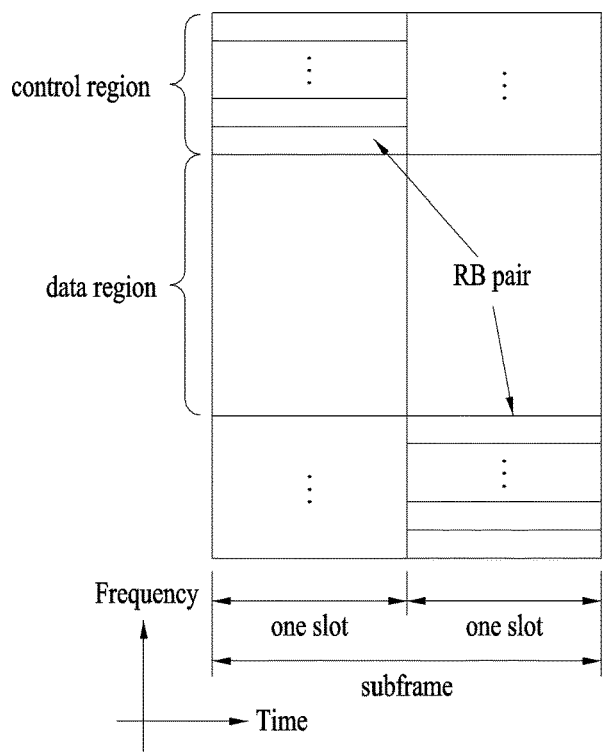
FIG. 4 exemplarily shows an uplink subframe structure.

FIG. 4 illustrates a UL subframe structure. A UL subframe may be divided into a control region and a data region in the frequency domain. A physical uplink control channel (PUCCH) carrying uplink control information is allocated to the control region. A physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs from an RB pair occupy different subcarriers in two slots. This is called frequency hopping of the RB pair allocated to the PUCCH over a slot boundary.

DCI Format

Currently, DCI formats 0, 1, 1A, 1B, 1C, 1D, 2, 2A, 2B, 2C, 3, 3A and 4 are defined in LTE-A (Release 10). DCI formats 0, 1A, 3 and 3A are defined to have the same message size to reduce the number of times of blind decoding, which will be described later. According to purposes of control information to be transmitted, the DCI formats may be divided into i) DCI formats 0 and 4, which are used for uplink grant, ii) DCI formats 1, 1A, 1B, 1C, 1D, 2, 2A, 2B and 2C, which are used for downlink scheduling allocation, and iii) DCI formats 3 and 3A, which are for power control commands.

DCI format 0 used for uplink grant may include a carrier indicator necessary for carrier aggregation, which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission in relation to a HARQ process, a transmit power control (TPC) command for a scheduled PUSCH, information about a cyclic shift for a demodulation reference signal (DMRS) and OCC index, and a UL index and channel quality indicator request (CSI request) necessary for a TDD operation. DCI format 0 does not include a redundancy version, unlike DCI formats relating to downlink scheduling allocation since DCI format 0 uses synchronous HARQ. The carrier indicator is not included in DCI formats when cross-carrier scheduling is not used.

DCI format 4, which is a new format added to LTE-A Release 10, supports application of spatial multiplexing to uplink transmission in LTE-A. DCI format 4 has a larger message size than DCI format 0 since it further includes information for spatial multiplexing. DCI format 4 includes additional control information in addition to the control information included in DCI format 0. That is, DCI format 4 includes information on a modulation and coding scheme for the second transmission block, precoding information for multi-antenna transmission, and sounding reference signal (SRS) request information. DCI format 4 does not include an offset for differentiation between formats 0 and 1A as it has a larger size than DCI format 0.

DCI formats 1, 1A, 1B, 1C, 1D, 2, 2A, 2B and 2C for downlink scheduling allocation may be broadly divided into DCI formats 1, 1A, 1B, 1C and 1D, which do not support spatial multiplexing, and DCI formats 2, 2A, 2B and 2C, which support spatial multiplexing.

DCI format 1C supports only frequency contiguous allocation as compact frequency allocation, but includes neither a carrier indicator nor a redundancy version, compared to the other formats.

DCI format 1A is intended for downlink scheduling and random access. DCI format 1A may include a carrier indicator, an indicator for indicating whether or not downlink distributed transmission is used, PDSCH resource allocation information, a modulation and coding scheme, a redundancy version, a HARQ processor number for indicating a processor used for soft combining, a new data indicator used to empty a buffer to implement initial transmission in relation to a HARQ process, a TPC command for a PUCCH, and an uplink index necessary for TDD operation.

DCI format 1 includes control information similar to that of DCI format 1A. DCI format 1 supports non-contiguous resource allocation, whereas DCI format 1A is related to contiguous resource allocation. Accordingly, DCI format 1 further includes a resource allocation header, and thus slightly increases control signaling overhead as a trade-off for increase in flexibility of resource allocation.

Both DCI formats 1B and 1D further include precoding information, compared to DCI format 1. DCI format 1B includes PMI acknowledgement, and DCI format 1D includes downlink power offset information. Most control information included in DCI formats 1B and 1D corresponds to that of DCI format 1A.

DCI formats 2, 2A, 2B and 2C basically include most of the control information included in DCI format 1A and further include information for spatial multiplexing. In this embodiment, the information for spatial multiplexing corresponds to a modulation and coding scheme for the second transmission block, a new data indicator, and a redundancy version.

DCI format 2 supports closed loop spatial multiplexing, and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C, which may be regarded as an extended version of DCI format 2B, supports spatial multiplexing for up to 8 layers.

DCI formats 3 and 3A may be used to complement the TPC information included in the aforementioned DCI formats for uplink grant and downlink scheduling allocation, namely, to support semi-persistent scheduling. A 1-bit command is used per UE in the case of DCI format 3, and a 2-bit command is used per UE in the case of DCI format 3A.

One of the DCI formats described above is transmitted over a PDCCH, and a plurality of PDCCHs may be transmitted in the control region. A UE may monitor the plurality of PDCCHs.

PDCCH Processing

Control channel elements (CCEs), which are contiguous logical allocation units, are used in mapping a PDCCH to REs. A CCE includes a plurality of resource element groups (e.g., 9 REGs). Each REG includes four REs which may neighbor each other if the RS is excluded.

The number of CCEs necessary for a specific PDCCH depends on a DCI payload corresponding to the size of control information, a cell bandwidth, a channel coding rate, etc. Specifically, the number of CCEs for a specific PDCCH may be defined according to PDCCH formats as shown in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As described above, one of the four formats may be used for a PDCCH, it is not known to the UE. Accordingly, the UE needs to perform decoding without knowing the PDCCH format. This is called blind decoding. Since decoding as many CCEs used for downlink as possible for each PDCCH format causes significant load to the UE, a search space is defined in consideration of restriction on the scheduler and the number of attempts to perform decoding.

That is, the search space is a set of candidate PDCCHs composed of CCEs which the UE needs to attempt to decode at an aggregation level. Each aggregation level and the corresponding number of candidate PDCCHs may be defined as shown in Table 2.

TABLE 2

| Search space | | Number of PDCCH candidates |
|---|---|---|
| Aggregation level | Size (in CCE units) | |
| UE-specific 1 | 6 | 6 |
| 2 | 12 | 6 |
| 4 | 8 | 2 |
| 8 | 16 | 2 |
| Common 4 | 16 | 4 |
| 8 | 16 | 2 |

As shown in Table 2, there are 4 aggregation levels, and the UE has a plurality of search spaces according to the aggregation levels. The search spaces may be divided into a UE-specific search space (USS) and a common search space (CSS), as shown in Table 2. The UE-specific search space is for specific UEs. Each UE may check an RNTI and CRC with which the PDCCH is masked, by monitoring the UE-specific search space thereof (attempting to decode a PDCCH candidate set according to a possible DCI format) and acquire control information if the RNTI and CRC are valid.

The CSS is intended for use in the case in which a plurality of UEs or all UEs need to receive PDCCHs, as in the cases of system information dynamic scheduling and paging messages. The CSS may be used for a specific UE in terms of resource management. Furthermore, the CSS may overlap the USS.

Specifically, the search space may be determined by Equation 1 given below.

$$L\left\{ (Y_k + m') \bmod \left\lfloor \frac{N_{CCE,k}}{L} \right\rfloor \right\} + i \qquad \text{Equation 1}$$

Here, L denotes an aggregation level, =k is a variable determined by an RNTI and subframe number k, and m' is the number of PDCCH candidates. If carrier aggregation is applied, $m'=m+M^{(L)} \cdot n_{CI}$; otherwise, m=m. Herein, m+0, . . . , $M^{(L)}-1$ and $M^{(L)}$ is the number of PDCCH candidates. $N_{CCE,k}$ is the total number of CCEs in the control region of a k-th subframe, and i is a factor indicating an individual CCE in each PDCCH candidate and is set as i=0, . . . , L−1. For the CSS, $Y_k$ is always determined to be 0.

Figure 5:
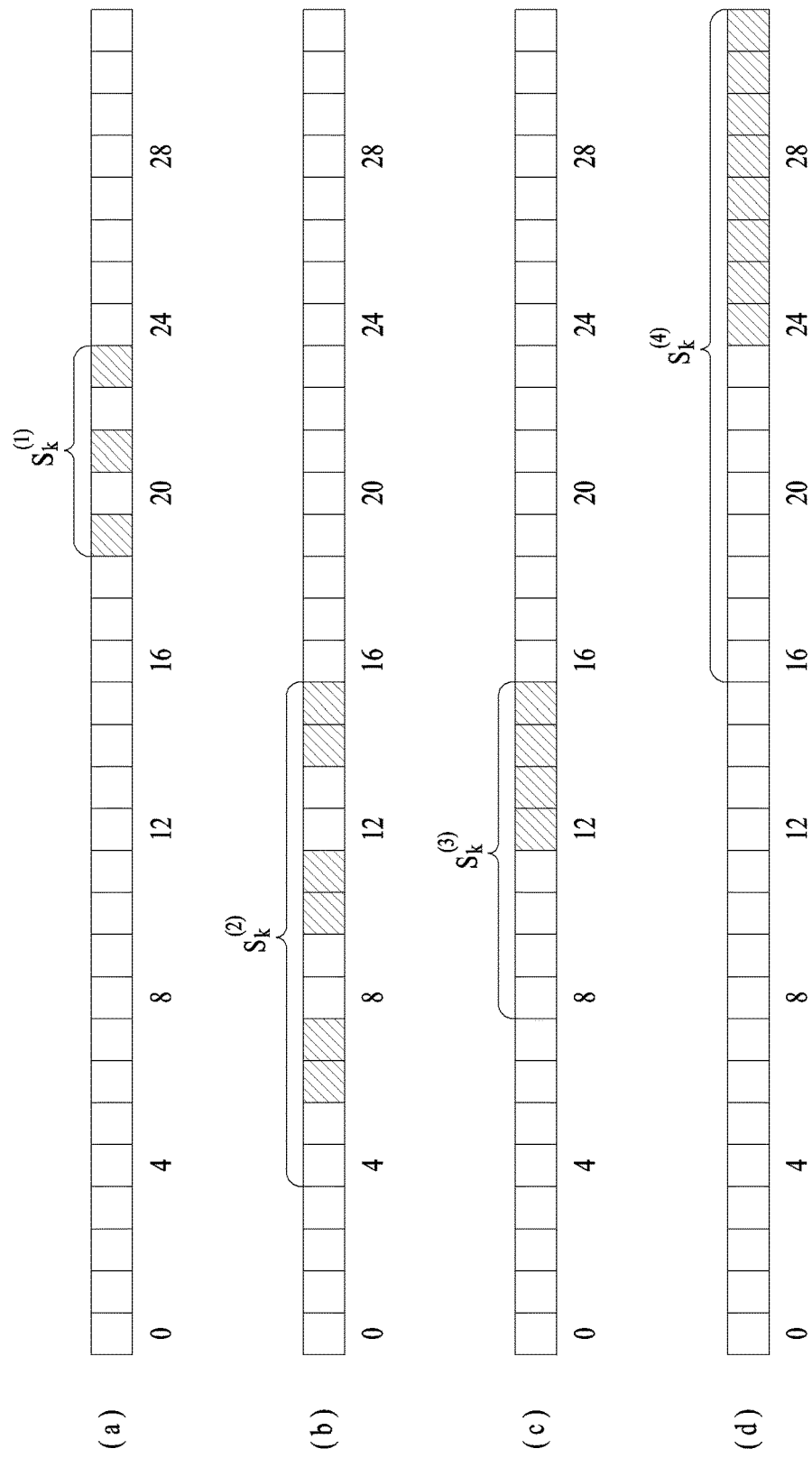
FIG. 5, including views (a)-(d), is a conceptual diagram illustrating a search space.

FIG. 5, including views (a)-(d), shows USSs (shaded portions) at respective aggregation levels which may be defined according to Equation 1. Carrier aggregation is not used, and $N_{CCE,k}$ is set to 32 for simplicity of illustration.

FIGS. 5(a), 5(b), 5(c) and 5(d) illustrate the cases of aggregation levels 1, 2, 4 and 8, respectively. The numbers represent CCE numbers. In FIG. 5, the start CCE of a search space at each aggregation level is determined based on an RNTI and subframe number k. This CCE may be differently determined for a UE at the respective aggregation levels in the same subframe according to the modulo function and L. The start CCE is always determined to correspond to a multiple of the corresponding aggregation level due to L. In the description given below, $Y_k$ is exemplarily assumed to be CCE number 18. The UE attempts to sequentially decode the CCEs starting with the start CCE in units of CCEs determined for a corresponding aggregation level. In FIG. 5(b), for example, The UE attempts to decode the CCEs two by two, starting with CCE 4, which is the start CCE, according to the aggregation level.

In this manner, the UE attempts to perform decoding in a search space. The number of decoding attempts is determined by a DCI format and a transmission mode determined through radio resource control (RRC) signaling. If carrier aggregation is not applied, the UE needs to attempt to perform decoding up to 12 times in the CSS, in consideration of two DCI sizes (DCI formats 0/1A/3/3A and DCI format 1C) for each of six PDCCH candidates. In the USS, the UE needs to attempt to perform decoding up to 32 times, in consideration of two DCI sizes for each of 16 (6+6+2+2=16) PDCCH candidates. Accordingly, when carrier aggregation is not applied, the UE needs to attempt to perform decoding up to 44 times.

On the other hand, if carrier aggregation is applied, the maximum number of decodings increases because as many decodings for a USS and DCI format 4 as the number of DL resources (DL component carriers) are added.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS. In more detail, an independent RS should be transmitted through each Tx port.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for a BS (eNB) or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) Positioning RS used to estimate geographical position information about a UE (i.e., to geolocate a UE).

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in situations such as handover. The latter is an RS that a BS (eNB) transmits along with downlink data in specific resources. A UE can demodulate the data by measuring a channel using the RS. This RS should be transmitted in a data transmission area.

CRSs serve two purposes, namely, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the BS (eNB) has two Tx antennas, CRSs for antenna ports 0 and 1 are transmitted. In the case of four Tx antennas, CRSs for antenna ports 0 to 3 are respectively transmitted.

FIG. 6, including view (a) and view (b), is a conceptual diagram illustrating a reference signal (RS). An RS mapping unit, (i.e., a downlink RB pair) may include one subframe in time by 12 subcarriers in frequency. That is, an RB pair includes 14 OFDM symbols in time in the case of the normal CP (see FIGS. 6(a)) and 12 OFDM symbols in time in the case of the extended CP (see FIG. 6(b)).

In FIG. 6, the positions of RSs in an RB pair for a system where a BS (eNB) supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DMRSs.

DeModulation Reference Signal (DMRS)

DMRS is a reference signal that is defined by a UE to implement channel estimation for PDSCH. DMRS may be used in Tx ports 7, 8, and 9. In the initial stages, although DMRS has been defined for transmission of a single layer corresponding to an antenna port 5, the DMRS has been extended for spatial multiplexing of a maximum of 8 layers. DMRS is transmitted only for a single specific UE as can be seen from a UE-specific reference signal (RS) corresponding to a different name of DMRS. Accordingly, DMRS can be transmitted only in an RB in which PDSCH for the specific UE is transmitted.

DMRS generation for a maximum of 8 layers will hereinafter be described in detail. In case of DMRS, a reference signal sequence r(m) generated by Equation 2 may be mapped to a complex-valued modulation symbols $a_{k,l}^{(p)}$ obtained by Equation 3. FIG. 7 shows that DMRS is mapped to a resource grid of a subframe in case of a general CP, and relates to antenna ports 7 to 10.

$$r(m) = \frac{1}{\sqrt{2}}\left(1 - 2 \cdot c(2m) + j\frac{1}{\sqrt{2}}(1 - 2 \cdot c(2m+1))\right),$$ [Equation 2]

$$m = \begin{cases} 0, 1, \ldots, 12N_{RB}^{max,DL} - 1 & \text{normal } CP \\ 0, 1, \ldots, 16N_{RB}^{max,DL} - 1 & \text{extended } CP \end{cases}$$

In Equation 2, r(m) is a reference signal sequence, c(i) is a pseudo-random sequence, and $N_{RB}^{max,DL}$ is a maximum number of RBs of a downlink bandwidth.

$$a_{k,l}^{(p)} = w_p(l') \cdot r(3 \cdot l' \cdot N_{RB}^{max,DL} + 3 \cdot n_{PRB} + m')$$ [Equation 3]

$$w_p(i) = \begin{cases} \bar{w}_p(i) & (m' + n_{PRB})\bmod 2 = 0 \\ \bar{w}_p(3 - i) & (m' + n_{PRB})\bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\bmod 2 + 2 & \text{Case of special subframe configurations 3, 4, 8, 9} \\ l'\bmod 2 + 2 + 3\lfloor l'/2 \rfloor & \text{Case of special subframe configurations 1, 2, 6, 7} \\ l'\bmod 2 + 5 & \text{Case in which special subframe is not given} \end{cases}$$

$$l = \begin{cases} 0, 1, 2, 3 & n_s\bmod 2 = 0, \text{Case of special subframe configurations 1, 2, 6, 7} \\ 0, 1 & n_s\bmod 2 = 0, \text{Case in which special subframe configurations 1, 2, 6, 7 are not given} \\ 2, 3 & n_s\bmod 2 = 1, \text{Case in which special subframe configurations 1, 2, 6, 7 are not given} \end{cases}$$

$$m' = 0, 1, 2$$

As can be seen from Equation 3, an orthogonal sequence $\bar{w}_p(i)$ shown in the following Table 3 is applied to the reference signal sequence r(m) when r(m) is mapped to a complex modulation symbol.

TABLE 3

| Antenna port $p$ | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

DMRS may perform channel estimation in different ways according to a spreading factor of 2 or 4. Referring to Table 1, an orthogonal sequence is repeated in the form of [a b a b] at antenna ports 7 to 10, such that the spreading factor is set to 2 at antenna ports 7~10 and the spreading factor is set to 4 at antenna ports 11~14. If the spreading factor is set to 2, a UE may despread each of a DMRS of a first slot and a DMRS of a second slot to the spreading factor of 2, and then perform channel estimation through time interpolation. If the spreading factor is set to 4, DMRS of the entire subframe is despread to the spreading factor of 4 at one time, such that channel estimation can be performed.

In the case of using the spreading factor of 2, the spreading-factor based channel estimation scheme may acquire not only a gain obtained because time interpolation is applied at high mobility, but also a gain of a decoding time because despreading to DMRS of the first slot is possible. In case of using the spreading factor of 4, the spreading-factor based channel estimation scheme can also support many more UEs or ranks.

Figure 8:
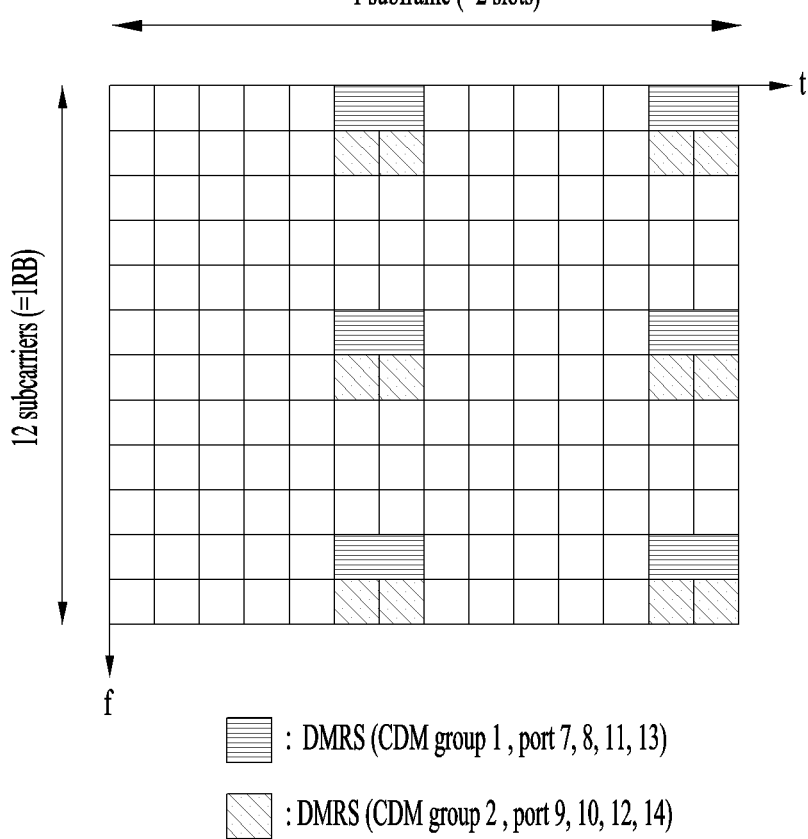
FIG. 8 is a conceptual diagram illustrating a Code Division Multiplexing (CDM) group.

The DMRS overhead aspect will hereinafter be described with reference to FIG. 8. FIG. 8 shows that DMRS is mapped to a subframe at each of antenna ports 7 to 14. As shown in FIG. 8, DMRS may be classified into CDM (Code Divisional Multiplexing) Group 1 and CDM Group 2 according to a resource-grid mapping position. In an RE corresponding to CDM Group 1, DMRS is transmitted through antenna ports 7, 8, 11, and 13. In an RE corresponding to CDM Group 2, DMRS is transmitted through antenna ports 9, 10, 12, and 14. That is, REs for DMRS transmission are identical to each other in antenna port(s) contained in one CDM group. Assuming that DMRS is transmitted only using the antenna port corresponding to CDM Group 1, the number of resource elements (REs) needed for DMRS is 12. That is, DMRS overhead is denoted by 12. Likewise, if the antenna port corresponding to CDM Group 2 is used, DMRS overhead is denoted by 24.

Coordinated Multi-Point (CoMP)

According to the improved system performance requirements of the 3GPP LTE-A system, CoMP transmission/reception technology (what may be referred to as co-MIMO, collaborative MIMO or network MIMO) is proposed. The CoMP technology can increase the performance of a UE located at a cell edge and increase average sector throughput.

In general, in a multi-cell environment in which a frequency reuse factor is 1, the performance of the UE located at the cell edge and average sector throughput may be reduced due to Inter-Cell Interference (ICI). In order to reduce the ICI, in the existing LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, the ICI is preferably reduced or the UE reuses the ICI as a desired signal. In order to accomplish the above object, a CoMP transmission scheme may be applied.

The CoMP scheme applicable to downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by coordination of the cells of the CoMP unit.

In this CoMP system, multi-cell BSs (eNBs) can support data for a UE. In addition, the BSs (eNBs) support one or more UEs simultaneously in the same radio frequency resources, thereby increasing system performance. The BSs (eNBs) may also operate in Space Division Multiple Access (SDMA) mode based on CSI between a UE and the eNBs.

A serving BS (eNB) and one or more cooperative BSs (eNBs) are connected to a scheduler through a backbone network in the CoMP system. The scheduler may receive channel information about the channel states between a UE and the cooperative eNBs, measured by each cooperative BS (eNB) and operate based on the channel information. For example, the scheduler may schedule information for cooperative MIMO for the serving BS (eNB) and the one or more cooperative BSs (eNBs). That is, the scheduler may transmit a command directly to each eNB with regard to the cooperative MIMO operation.

As can be seen from the above description, it can be recognized that a CoMP system operates as a virtual MIMO system by grouping a plurality of cells into one group. Basically, the CoMP system adopts a MIMO communication scheme using multiple antennas.

Transmission Mode

The BS (or eNB) may configure the transmission mode according to a channel status associated with the UE through UE-specific higher layer signaling. In response to the transmission mode, DCI format 1A (fallback mode DCI) to always be decoded in the UE-specific search space, DCI format to be decoded by the UE, and a PDSCH (i.e., PDSCH corresponding to PDCCH) transmission scheme indicated by DL allocation of each DCI format may be decided by the UE. The following Table 4 shows this relationship.

TABLE 4

| Transmission mode | DCI format | Search Space | Transmission scheme of PDSCH corresponding to PDCCH |
|---|---|---|---|
| Mode 1 | 1A | Common search space (CSS) and UE-specific search space (Common and UE specific by C-RNTI) | Single antenna port, Port 0 |
|  | 1 | UE-speciftc search space (UE specific by C-RNTI) | Single antenna port, Port 0 |
| Mode 2 | 1A | Common search space (CSS) and UE-specific search space | Transmit diversity |
|  | 1 | UE-specific search space | Transmit diversity |
| Mode 3 | 1A | Common search space (CSS) and UE-specific search space | Transmit diversity |
|  | 2A | UE-specific search space | Large delay cyclic delay diversity (CDD) or Tx diversity |
| Mode 4 | 1A | Common search space (CSS) and UE-specific search space | Transmit diversity |
|  | 2 | UE-specific search space | Closed Loop Spatial Multiplexing or Closed Loop Spatial Multiplexing or Transmit Diversity |

TABLE 4-continued

| Transmission mode | DCI format | Search Space | Transmission scheme of PDSCH corresponding to PDCCH |
|---|---|---|---|
| Mode 5 | 1A | Common search space (CSS) and UE-specific search space | Transmit diversity |
|  | 1D | UE-specific search space | Multi-user MIMO |
| Mode 6 | 1A | Common search space (CSS) and UE-specific search space | Transmit diversity |
|  | 1B | UE-specific search space | Closed Loop Spatial Multiplexing using single layer |
| Mode 7 | 1A | Common search space (CSS) and UE-specific search space | If one PBCH antenna port is present, Port #0 is used, and the remaining ports other than Port #0 correspond to Tx diversity. |
|  | 1 | UE-specific search space | Single Antenna Port, Port 5 |
| Mode 8 | 1A | Common search space (CSS) and UE-specific search space | If one PBCH antenna port is present, Port #0 is used, and the remaining ports other than Port #0 correspond to Tx diversity |
|  | 2B | UE-specific search space | Dual-layer transmission of Antenna Ports #7 and #8 or Single Antenna Port of Antenna port #7 or #8 |
| Mode 9 | 1A | Common search space (CSS) and UE-specific search space | If MBSFN subframe is not decided, this means that one PBCH antenna port is present and Port #0 is used. In the remaining cases other than this case, Tx diversity is decided. If MBSFN subframe is decided, this means that single antenna port is used and Port #7 is used. |
|  | 2C | UE-specific search space | 8-Layer Transmission - Use of Ports 7-14 or Single Antenna Port of Antenna Port #7 or #8 |
| Mode 10 | DCI format 1A | Common search space (CSS) and UE-specific search space | If MBSFN subframe is not decided, this means that one PBCH antenna port is present and Port #0 is used. In the remaining cases other than this case, Tx diversity is decided. If MBSFN subframe is decided, this means that single antenna port is used and Port #7 is used. |
|  | DCI format 2D | UE-specific search space | 8-Layer Transmission - Use of Ports 7-14 or Single Antenna Port of Antenna Port #7 or #8 |

As can be seen from Table 4, assuming that DCI format 1A is configured, the UE may recognize/regard single port transmission employing Port 0, transmit diversity employing two or more ports, and single port transmission employing Port 7 as a PDSCH transmission scheme.

Enhanced-PDCCH(EPDCCH)

In an LTE system after Release 11, enhanced-PDCCH (EPDCCH) is considered as a solution to lack of capacity of a PDCCH due to coordinated multi-point (COMP), multi user-multiple input multiple output (MU-MIMO), and the like and degradation of PDCCH performance due to inter-cell interference. In addition, channel estimation may be performed on an EPDCCH based on DMRSs contrary to the existing CRS-based PDCCH, in order to obtain a pre-coding gain. The above-mentioned DMRS may be referred to as "DMRS associated with EPDCCH", differently from DMRS (i.e., DMRS associated with PDSCH) used for channel estimation for PDSCH decoding.

The UE may perform blind decoding as in a legacy LTE/LTE-A system to receive/acquire DCI over an EPD-CCH. More specifically, the UE may attempt to decode (or monitor) a set of EPDCCH candidates at each aggregation level, for DCI formats corresponding to set transmission modes. Herein, the set of EPDCCH candidates subjected to monitoring may be referred to as a specific search space for the EPDCCH UE, and the search space may be set/configured for each aggregation level. In addition, the aggregation levels may be { 1, 2, 4, 8, 16, 32} according to a type of a subframe, the length of a CP, and the amount of available resources in a PRB pair, which is much or little different from the case of a legacy LTE/LTE-A system.

For a UE having an EPDCCH configured, REs included in a PRB pair set are indexed by EREGs, and the EREGs are in turn indexed by ECCEs. EPDCCH candidates configuring the search space may be determined based on the indexed ECCEs and then blind decoding may be performed. Thereby, control information may be received. Herein, EREG corresponds to REG in the legacy LTE/LTE-A and ECCE corresponds to CCE in the legacy LTE/LTE-A. A PRB pair may include 16 EREGs.

EPDCCH transmission may be divided into localized EPDCCH transmission and distributed EPDCCH transmission according to configuration of a PRB pair used for EPDCCH transmission. Localized EPDCCH transmission represents a case in which ECCEs used for transmission of one DCI are adjacent to each other in the frequency domain, and specific precoding may be applied to obtain a beamforming gain. For example, localized EPDCCH transmission may be based on consecutive ECCEs the number of which corresponds to an aggregation level. On the other hand, distributed EPDCCH transmission represents transmission of an EPDCCH in a separated PRB pair in the frequency domain, and has an advantage with regard to frequency diversity. For example, distributed EPDCCH transmission may be based on the ECCE having four EREGs (for example, if special subframe configuration (#1, #2, #6, #7, #9) and the extended CP are decided, 8 EREGs may be used) included in each PRB pair separated in the frequency domain.

In association with an exemplary case (e.g., Dynamic (transmission/reception) Point Selection(DPS), Joint Transmission(JT), or the like) in which EPDCCH is transmitted from one or two Tx points, some items need to be defined, and as such a detailed description thereof will hereinafter be given. If EPDCCH can be transmitted from two or more Tx points, two or more Tx points contained in the CoMP cluster may transmit the EPDCCH sorted by a resource set of a predetermined unit. In this case, the resource set based on a predetermined unit may represent a PRB pair set, two or more subsets in the PRB pair, etc. If EPDCCH is transmitted from two or more Tx points, it is necessary for the UE to quickly and correctly detect large scale properties (including received timing, received power, frequency shift, Doppler spread, delay spread, etc.) of signals transmitted from different Tx points. In addition, in order to correctly detect the above properties, there is a need to detect signal properties of the corresponding Tx point not only using DMRS transmitted along with EPDCCH but also using another signal of the corresponding Tx point. If the above-mentioned large scale properties are not rapidly recognized, the processing time may increase due to the occurrence of a delay time or the like. In addition, if the large scale properties are not correctly recognized, decoding of the corresponding signal may fail.

QCL (Quasi Co-Located) Assumption According to Transmission Mode

In order to address the above-mentioned issues, it may be assumed that DMRS associated with EPDCCH and another specific signal are Quasi Co-Located (QCL) (or is in QCI relationship with another specific signal) during channel estimation through DMRS associated with EPDCCH. In this case, the QCL processing, or the QCL relationship may indicate that 'DMRS associated with EPDCCH' and the above specific signal have the same large scale properties (received timing, received power, frequency shift, Doppler spread, delay spread, etc.), or may also indicate that large scale properties can be recognized using the above specific signal during channel estimation based on 'DMRS associated with EPDCCH'.

In more detail, the UE configured to receive control information over EPDCCH can receive one or two EPDCCH PRB pair sets (including one or more EPDCCH PRB pairs). In association with each EPDCCH PRB set, DMRS associated with EPDCCH is received at the EPDCCH PRB set, so that channel estimation can be performed. (That is, each EPCCH candidate may perform blind decoding using (predetermined) one or more DMRS port(s) according to the frequency/time resource position and the localized/distributed EPDCCH of the corresponding candidate.) In this case, the UE may perform channel estimation through 'DMRS associated with EPDCCH' on the assumption that 'DMRS associated with EPCCH' and a specific signal are quasi co-located on the basis of the UE transmission mode.

In this case, the QCL assumption based on transmission mode may indicate that, in case of a predetermined transmission mode/specific transmission mode (e.g., in case of a single cell operation), the serving cell CRS transmitted with Antenna Ports 0~3 and DMRS associated with EPDCCH are quasi co-located. For example, if the transmission mode configured to UE through RRC signaling or the like is set to any one of transmission modes 1~9, this means that DPS or the like is not applied to EPDCCH. Therefore, the UE may use the serving cell CRS when performing channel estimation based on 'DMRS associated with EPDCCH' (more specifically, when recognizing large scale properties), so that the UE can perform channel estimation and can also decode EPDCCH according to the channel estimation result. If the transmission mode configured to UE through RRC signaling is set to a transmission mode (e.g., TM 10) associated with CoMP, the UE may assume that the previously-signaled non-zero CSI-RS are quasi co-located with DMRS associated with EPDCCH.

The above-mentioned description may also be applied to the case of DMRS associated with PDSCH. In more detail, under a specific transmission mode, the UE may assume that the cell-specific reference signal (RS) and DMRS associated with PDSCH are quasi co-located. In other words, the UE for use in the above-mentioned specific transmission mode may estimate large scale properties of the channel from the serving cell CRS (or along with CRS or using CRS) during DMRS-based channel estimation for PDSCH decoding. In more detail, for example, if the UE is configured to transmission modes 1~9, it may be assumed that the serving cell CRS and DMRS associated with PDSCH are quasi co-located. If the UE is configured to the transmission mode 10, it may be assumed that the previously signaled non-zero power CSI-RS and DMRS associated with PDSCH are quasi co-located.

If transmission mode configured to the UE is set to a specific transmission mode, the UE assumes that DMRS associated with EPDCCH/PDSCH and a specific signal (e.g., the serving cell CRS, or specific non-zero power CSI-RS configuration(s)) are quasi co-located. However, the fact that DMRS associated with EPDCCH/PDSCH and a specific signal are quasi co-located may be notified through signaling. In this case, signaling information indicating that DMRS associated with EPDCCH/PDSCH and a specific signal are quasi co-located may decide the presence or absence of validity according to the transmission mode. Alternatively, under a specific TM, QCL information may be signaled by independent signaling instead of the previously signaled QCL information (indicating that DMRS associated with EPDCCH/PDSCH and a specific signal are quasi co-located).

As described above, if QCL information is applied to each transmission mode, the UE operation may be achieved as shown in the following example. In the following description, the UE operation is classified into EPDCCH operation A and EPDCCH operation B, information indicating which EPDCCH operation will be applied to a specific transmission mode may be promised or may be semi-statically indicated through RRC signaling or the like.

EPDCCH operation A may assume that all EPDCCH ports are QCL with the serving cell CRS port. EPDCCH operation B may assume that EPDCCH ports are not QCL with CRS, PDSCH DMRS, and PSS/SSS, excluding the following exceptional example. As the exceptional example, if the localized EPDCCH set is configured, it may be assumed that each EPDCCH port and the RRC-configured CSI-RS resources are quasi co-located. Alternatively, if the distributed EPDCCH set is configured, it may be assumed that all EPDCCH ports of each set are QCL with RRC-configured CSI-RS resources.

Alternatively, EPDCCH operation A may assume that all EPDCCH ports are QCL with the serving cell CRS port. EPDCCH operation B may assume that EPDCCH ports are not QCL with CRS, PDSCH DMRS, and PSS/SSS, excluding the following exceptional example. As the exceptional example, if the distributed EPDCCH set is configured, it may be assumed that each EPDCCH port and the RRC-configured CRI-RS resources are quasi co-located. Alternatively, the localized EPDCCH set is configured, it may be assumed that all EPDCCH ports of each set are QCL with RRC-configured CSI-RS resources.

Alternatively, a common EPDCCH operation B for the localized/distributed schemes may assume that EPDCCH port is not QCL with CRS, PDSCH DMRS, and PSS/SSS, excluding the following exceptional example. The exceptional example may assume that all EPDCCH ports of each set are QCL with RRC-configured CSI-RS resources.

The UE configured to transmission modes 1~8 may assume the use of EPDCCH operation A so that EDCCH reception may be predefined. In item (i), UE configured to transmission mode 9 may assume that, if CSI-RS resource is configured through RRC signaling, EPDCCH operation B is used. In item (ii), if CSI-RS resource is not configured (for example, TDD, operation based on reciprocity, etc.), the UE configured to transmission mode 9 assumes the use of EPDCCH operation A. In item (iii), the UE configured to transmission mode 9 may indicate which one of EPDCCH operation A and EPDCCH operation B will be used for each EPDCCH set (or for each EPDCCH port, for each specific EPDCCH transmission scheme) through RRC signaling or the like. Successively, the UE configured to transmission mode 10 may be defined in a manner that EPDCCH operation B is always carried out.

Signaling of QCL Information for Each Resource Set

QCL information (indicating that DMRS associated with EPDCCH/PDSCH and a specific signal are quasi co-located) may be signaled per resource set. In this case, the specific signal may include CRS, CSI-RS, PSS/SSS, PBCH, etc. If the specific signal is set to CRS, information (i.e., v-shift, the number of ports, the number of ports, etc.) may be additionally signaled. The above-mentioned information may be transferred through the list of neighbor cells or the like. If the specific signal is CSI-RS, CSI-RS configuration information (e.g., (virtual) cell ID, CSI-RS position, number of ports, transmission period, transmission time, etc.) may also be additionally transmitted. Alternatively, CSI-RS information signaled for CoMP operation or the like may also be used. If the specific signal is PSS/SSS, cell ID (or group ID), Tx timing, etc. may be additionally signaled. If PSS/SSS of the serving Tx point is not decided, information indicating whether the subframe border between the serving Tx point and the Tx point transmitting PSS/SSS is arranged, and information regarding the subframe offset or the like may be additionally transmitted. If the specific signal is PBCH, PBCH associated information (Tx timing, etc.) may be additionally transmitted.

The QCL information may be signaled for each predetermined resource set. In this case, a basic unit of the resource set may be any one of (i) the overall PRB pair set signaled to the UE for EPDCCH usage; ii) a specific CDM group (e.g., Ports 7&8 or 7&9) contained in the overall PRB pair set; iii) a specific port contained in the overall PRB pair set; iv) a specific scrambling sequence contained in the overall PRB pair set; v) a specific EPDCCH transmission scheme (localized/distributed); vi) a specific PRB pair set (e.g., Ports 7&8 or 7&9) from among the PRB pair sets signaled to the UE for EPDCCH usage; vii) a specific CDM group contained in the same PRB pair set; viii) a specific port contained in the same PRB pair set; and ix) a specific scrambling sequence contained in the same PRB pair set. For example, in the case of (vi), QCL information may be signaled to each EPDCCH PRB set. The UE having received the above signaling may derive large scale properties for EPDCCH decoding using the QCL specific signal and the DMRS associated with EPDCCH/PDSCH, resulting in increased accuracy of channel estimation.

Figure 9:
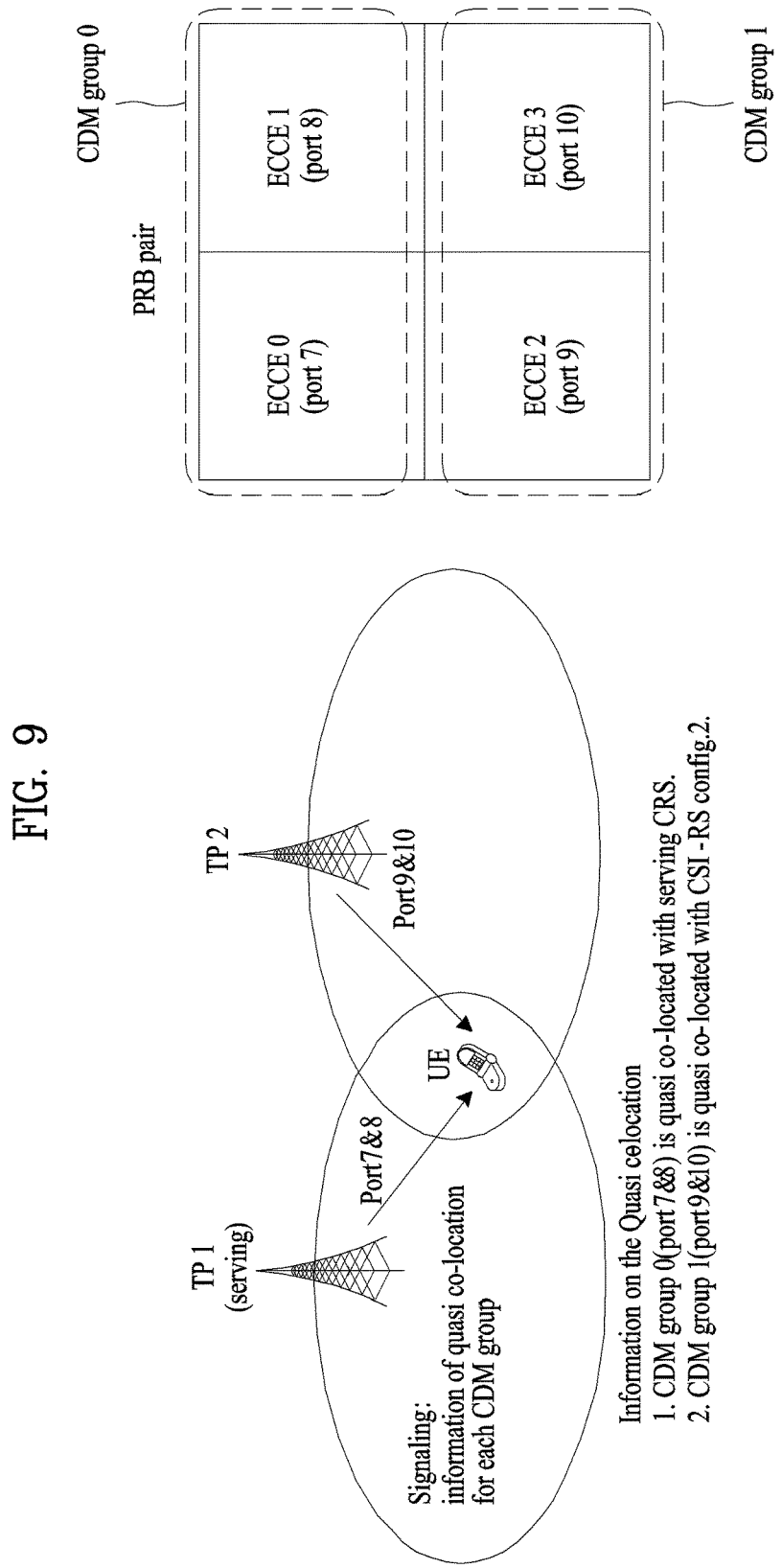
FIGS. 9 and 10 are conceptual diagrams illustrating channel estimation according to an embodiment of the present invention.
Figure 10:
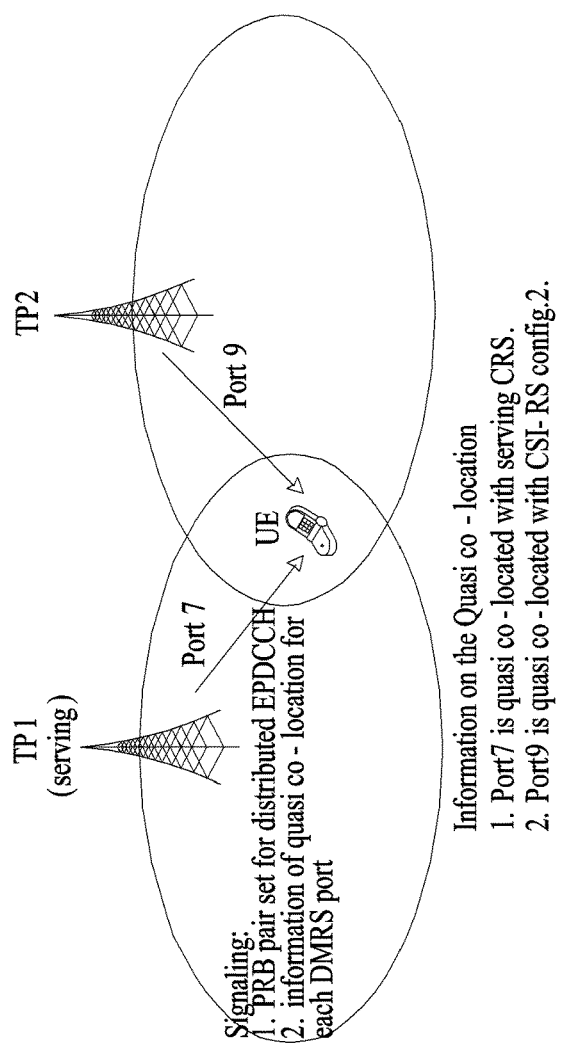

FIGS. 9 and 10 illustrate the detailed examples in which QCL information is applied to each resource set.

Referring to FIG. 9, resources contained in one PRB pair are divided according to ports (or CDM groups), and the resultant resources are allocated to different Tx points (TP1, TP2). Under this situation, the network may allow the Tx point having better channel environment to transmit EPDCCH. In this case, allocating ports contained in the same CDM group to different Tx points may deteriorate dispreading throughput due to different large scale properties, and it is preferable that port distribution be achieved in units of a CDM group. That is, as can be seen from FIG. 9, Ports 7&8 may be allocated to Tx point, and Ports 9&10 may be allocated to Tx point 2.

Specific information indicating that DMRS of CDM Group 0 is QCL-processed with CRS of Tx point 1 and DMRS of CDM Group 1 is QCL-processed with CSI-RS configuration 2 may be signaled to the UE. (In this case, QCL information of CDM Group 0 may be omitted, and the CDM group in which the corresponding information is not signaled may be QCL-processed with RS (e.g., CRS, DMRS) of the current serving cell.) Thereafter, the serving Tx point may change or maintain the Tx point for EPDCCH transmission on the basis of a channel state information reported by the UE.

FIG. 10 illustrates that QCL information is signaled for each DMRS port in the case of distributed EPDCCH transmission. That is, the fact that DMRS Port 7 is QCL-processed with CS of Tx point 1 acting as the serving cell and DMRS Port 9 is QCL-processed with CRS-RS configuration 2 related to Tx point 2 may be signaled. The UE may use the large scale properties of a specific signal indicated by signaling according to the DMRS port within one PRB pair. In addition, differently from the example of FIG. 10, QCL information for each DMRS scrambling sequence and QCL information for different scrambling sequences of different ports may be signaled.

The above-mentioned description relates to signaling of the QCL relationship between each resource set used for EPDCCH transmission and a specific signal. However, the Tx point having the QCL relationship with the resource set may be directly signaled. In this case, the Tx point may be indicated in the form of RS (CRS, CSI-RS) information that is always transmitted by a Tx point that transmits EPDCCH in each EPDCCH PRB set. In the above-mentioned case, the UE may improve the EPDCCH decoding throughput using signals (e.g., CRS, CSI-RS, PSS/SSS, PBCH, etc.) transmitted from the Tx point having the QCL relationship.

Independent Signaling of QCL Information for Each Resource Set

A resource set (specifically, QCL information for each EPDCCH PRB set) may independently perform RRC signaling. For example, two EPDCCH PRB sets are configured for the UE. In case of (i), DMRS configuration/QCL assumption for each EPDCCH PRB set may be signaled through two independent information elements. Alternatively, in case of (ii), information for each EPDCCH PRB set may be signaled through two sub-information elements contained in one information element. The above-mentioned cases (i) and (iii) may be made available only when the configuration of any one of two EPDCCH PRB sets is changed.

If QCL information of any one of the two EPDCCH PRB sets is signaled, this means that QCL information of the EPDCCH PRB set for QCL signaling is applied to the remaining EPDCCH PRB sets for which QCL information is not signaled. In the case of the transmission mode other than transmission mode 10, there is a need to consider the fact that applying different kinds of QCL information to respective EPDCCH sets is meaningless. In more detail, RRC signaling for each EPDCCH PRB set may include at least one of the following parameters i), ii), iii), iv), and v). The parameter (i) is a transmission (Tx) type of the EPDCCH PRB set. For example, the parameter (i) may indicate whether to use the localized type or the distributed type. The parameter (ii) is PRB pair information (e.g., the number of PRB pairs and the position of PRB pairs) constructing the EPDCCH PRB set. The parameter (iii) is a scrambling parameter to be used for blind decoding for the EPDCCH PRB set. The parameter (iv) is QCL assumption (e.g., serving cell CRS, CSI-RS configuration) of the EPDCCH PRB set. The parameter (v) is an EPDCCH rate matching pattern for use in the EPDCCH PRB set. For example, the EPDCCH rate matching pattern may include the EPDCCH start position (or start position value) of the EPDCCH PRB set, information indicating whether PDFICH is applied or not, a CRS pattern, (zero power/non-zero power) CSI-RS configuration, MBSFN subframe pattern, etc. Some parts of the above-mentioned parameters may not be differently configured to two EPDCCH PRB sets according to whether or not the transmission mode 10 is used. Alternatively, although some parts of the above-mentioned parameters may be differently configured to two EPDCCH PRB sets, this situation may be meaningless. Therefore, if the above-mentioned situation in which some parameters of each EPDCCH PRB set are differently configured is impossible or meaningless, the some parameters are not contained in the signaling action of one EPDCCH PRB set, and may be replaced with signaling information of the remaining EPDCCH PRB set. If a specific parameter is not transmitted through signaling of only one EPDCCH PRB set, the UE may recognize that the above parameter is identical to a specific parameter for signaling of the remaining EPDCCH PRB sets.

If QCL information of any one of two EPDCCH PRB sets is signaled, the remaining EPDCCH PRB sets for which QCL information is not signaled may recognize maintenance of the legacy QCL information. In addition, if a specific parameter is not contained in the above-mentioned enumerated parameters in case of signaling of the EPDCCH PRB set, the UE may recognize this specific parameter as an indication message for maintaining the legacy parameter.

Meanwhile, the EPDCCH PRB set configuration may include information indicating whether the corresponding EPDCCH PRB set is for localized transmission or for distributed transmission. In addition, the number of blind decoding actions to be conducted in the corresponding EPDCCH PRB set may be signaled to each EPDCCH PRB set. In this case, in order to reduce overhead for signaling the number of blind decoding actions for each EPDCCH PRB set, it may be possible to use the scheme for deciding a transmission type of the corresponding EPDCCH PRB set, the number of PRB pairs constructing the corresponding EPDCCH PRB set, etc. In the above-mentioned process, a method for using RRC signaling is as follows.

In the following example, it is assumed that the EPDCCH PRB set for distributed transmission is assigned many more blind decoding attempts than in the localized-transmission EPDCCH PRB set. As the number of PRB pairs constructing each EPDCCH PRB set increases, many more blind decoding attempts are assigned.

In this case, the following RRC signaling may be used to reduce RRC signaling overhead. If two EPDCCH PRB sets are used, EPDCCH PRB set 1 may always be composed of PRB pairs, the number of which is equal to or higher than that of EPDCCH PRB set 2. It may be assumed that the number of PRB pairs constructing the PRB pair set for distributed transmission is always higher than the number of PRB pairs constructing the PRB pair for localized transmission. In this case, a method for analyzing the field indicating a transmission type of EPDCCH PRB set 2 according to a transmission type of EPDCCH PRB set 1 is as follows. If the transmission type of EPDCCH PRB set 1 is for distributed transmission, the transmission type of EPDCCH PRB set 2 may be distributed or localized transmission. The UE may recognize which transmission type will be used in EPDCCH PRB set 2 through the corresponding field of EPDCCH PRB set 2. If the transmission type of EPDCCH PRB set 1 is set to the localized transmission, the transmission type of EPDCCH PRB set 2 is determined to be the localized transmission according to the assumption that the number of PRB pairs of EPDCCH PRB set 1 is higher than the number of PRB pairs of EPDCCH PRB set 2. Therefore, the field indicating the transmission type of EPDCCH PRB set 2 need not be activated. That is, the specific transmission scheme has many more blind decoding (BD) actions as compared to another transmission scheme. If the number of BD actions of the corresponding EPDCCH PRB set is determined in proportion to the number of PRB pairs constructing the EPDCCH PRB set, a specific EPDCCH PRB set (e.g., EPDCCH PRB set 1) from among two EPDCCH PRB sets may be composed of PRB pairs, the number of which is equal to or higher than the number of other EPDCCH PRB sets. The transmission scheme of another EPDCCH PRB set may be recognized according to the transmission scheme of the corresponding EPDCCH PRB set.

The following methods for allowing the UE to signal the number of EPDCCH PRB sets to be blind decoded are as follows.

First, the network may configure the number of EPDCCH PRB sets, and may inform the UE of only the configuration of each EPDCCH PRB set. In this case, only the actually used EPDCCH PRB set is signaled, so that unnecessary signaling overhead can be reduced.

Second, the network may omit signaling of the number of EPDCCH PRB sets (if a maximum value of an EPDCCH PRB set capable of being previously signaled is decided), and as many configurations as a maximum number of EPDCCH PRB sets may always be signaled. In this case, the field indicating activation or deactivation of the corresponding EPDCCH PRB set is inserted into each configuration, so that activation or deactivation of the corresponding EPDCCH PRB set may be indicated. In accordance with another method for signaling activation or deactivation of the corresponding EPDCCH PRB set, if a specific parameter from among parameters contained in the EPDCCH PRB set configuration is not signaled (or is signaled as a specific value), this means that the corresponding EPDCCH PRB set is deactivated. For example, if the parameter indicating the number and position of PRB pairs contained in the corresponding EPDCCH PRB set is not signaled or is signaled in the form of a bitmap, assuming that all bits are set to zero, this means that the corresponding EPDCCH PRB set is deactivated.

Apparatus According to this Embodiment

Figure 11:
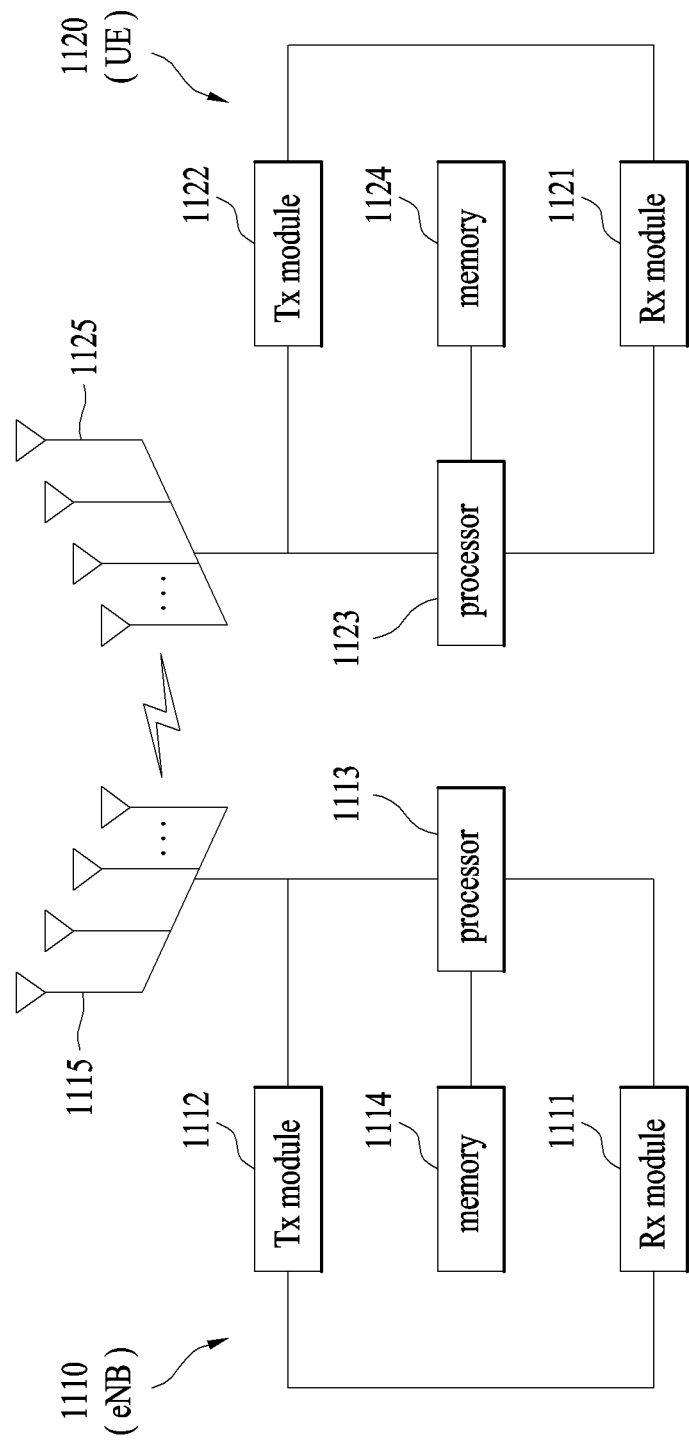
FIG. 11 is a block diagram illustrating a transceiver apparatus according to embodiments of the present invention.

FIG. 11 is a block diagram illustrating a transmission point apparatus and a UE apparatus according to embodiments of the present invention.

Referring to FIG. 11, the transmission point apparatus 1110 according to the present invention may include a reception (Rx) module 1111, a transmission (Tx) module 1112, a processor 1113, a memory 1114, and a plurality of antennas 1115. The plurality of antennas 1115 indicates a transmission point apparatus for supporting MIMO transmission and reception. The reception (Rx) module 1111 may receive a variety of signals, data and information on an uplink starting from the UE. The Tx module 1112 may transmit a variety of signals, data and information on a downlink for the UE. The processor 1113 may provide overall control to the transmission point apparatus 1110.

The processor 1113 of the transmission point apparatus 1110 according to one embodiment of the present invention can process the above-mentioned embodiments.

The processor 1113 of the transmission point apparatus 110 processes information received at the transmission point apparatus 1110 and transmission information to be transmitted externally. The memory 1114 may store the processed information for a predetermined time. The memory 1114 may be replaced with a component such as a buffer (not shown).

Referring to FIG. 11, the UE apparatus 1120 may include an Rx module 1121, a Tx module 1122, a processor 1123, a memory 1124, and a plurality of antennas 1125. The plurality of antennas 1125 indicates a UE apparatus supporting MIMO transmission and reception. The Rx module 1121 may receive downlink signals, data and information from the BS (eNB). The Tx module 1122 may transmit uplink signals, data and information to the BS (eNB). The processor 1123 may provide overall control to the UE apparatus 1120.

The processor 1123 of the UE apparatus 1120 according to one embodiment of the present invention can process the above-mentioned embodiments.

The processor 1123 of the UE apparatus 1120 processes information received at the UE apparatus 1120 and transmission information to be transmitted externally. The memory 1124 may store the processed information for a predetermined time. The memory 1124 may be replaced with a component such as a buffer (not shown).

The specific configurations of the transmission point apparatus and the UE apparatus may be implemented such that the various embodiments of the present invention are performed independently or two or more embodiments of the present invention are performed simultaneously. Redundant matters will not be described herein for clarity.

The description of the transmission point apparatus 1110 shown in FIG. 11 may be applied to the eNB (BS), or may also be applied to a relay node (RN) acting as a DL transmission entity or UL reception entity without departing from the scope or spirit of the present invention. In addition, the description of the UE apparatus 1120 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention can be applied to a variety of mobile communication systems.

What is claimed is:

1. A method for receiving a downlink control channel in a wireless communication system by a user equipment (UE), the method comprising:
receiving first quasi co-located (QCL) information for a first control resource set and second QCL information for a second control resource set;
receiving a first demodulation reference signal (DMRS) included in the first control resource set and a second DMRS included in the second control resource set;
demodulating a first downlink control channel based on the first DMRS included in the first control resource set and the first QCL information; and
demodulating a second downlink control channel based on the second DMRS included in the second control resource set and the second QCL information.

2. The method according to claim 1, wherein the first and second QCL information is related to at least one of Doppler Shift, Doppler spread, delay spread, and/or average delay.

3. The method according to claim 1, wherein the UE assumes that the first and second DMRS are quasi co-located with a channel state information-reference signal (CSI-RS).

4. The method according to claim 1, wherein the UE assumes that the first and second DMRS are quasi co-located with a primary synchronization signal (PSS), a secondary synchronization signal (SSS) and Physical Broadcast Channel (PBCH).

5. The method according to claim 1, wherein the UE assumes the first and second DMRS related to a physical downlink shared channel (PDSCH) are quasi co-located with a channel state information-reference signal (CSI-RS).

6. The method according to claim 1, wherein the UE assumes that the first and second DMRS are quasi co-located with a cell-specific reference signal (CRS).

7. The method according to claim 1, wherein the first and second QCL information includes information of antenna ports which can be assumed that the antenna ports are quasi co-located with the first and second DMRS.

8. The method according to claim 1, wherein the first and second QCL information are received via Radio Resource Control (RRC) signaling.

9. The method according to claim 1, wherein the first and second QCL information for each is of the first and second control resource sets are received through an independent information element (IE).

10. The method according to claim 9, wherein the UE assumes that legacy QCL information is maintained in the first and second control resource sets for which QCL information is not signaled.

11. The method according to claim 1, wherein the first downlink control channel comprises a first physical downlink control channel (PDCCH) and the second downlink control channel comprises a second PDCCH.

12. The method according to claim 1, further comprising:
monitoring the downlink control channel in the first control resource set and the second control resource set.

13. A user equipment (UE) for receiving a downlink control channel in a wireless communication system, the UE comprising:
a receiver; and
a processor configured to:
control the receiver to receive first quasi co-located (QCL) information for a first control resource set and second QCL information for a second control resource set,
control the receiver to receive a first demodulation reference signal (DMRS) included in the first control resource set and a second DMRS included in the second control resource set,
demodulate a first downlink control channel based on the first DMRS included in the first control resource set and the first QCL information, and
demodulate a second downlink control channel based on the second DMRS included in the second control resource set and the second QCL information.

* * * * *